United States Patent [19]
Cok et al.

[11] Patent Number: 6,101,321
[45] Date of Patent: *Aug. 8, 2000

[54] METHOD AND APPARATUS FOR BROADCASTING DATA IN A RING CONNECTED MULTIPROCESSOR

[75] Inventors: Ronald Steven Cok; Horia Neamtu, both of Rochester, N.Y.

[73] Assignee: Eastman Kodak Company, Rochester, N.Y.

[*] Notice: This patent is subject to a terminal disclaimer.

[21] Appl. No.: 08/310,892

[22] Filed: Sep. 22, 1994

Related U.S. Application Data

[63] Continuation of application No. 07/866,723, Apr. 10, 1992, abandoned.

[51] Int. Cl.[7] .................................................. G06F 15/163

[52] U.S. Cl. ............................... 395/200.81; 395/200.31; 395/200.68; 395/200.72; 395/800.28; 370/258

[58] Field of Search ..................................... 395/800, 200, 395/200.31, 200.68, 200.72, 200.81, 800.28; 370/258

[56] References Cited

U.S. PATENT DOCUMENTS

| | | | |
|---|---|---|---|
| 4,334,305 | 6/1982 | Girardi | 370/85.15 |
| 4,383,314 | 5/1983 | Tam | 370/85 |
| 4,412,285 | 10/1983 | Neches et al | 395/650 |
| 4,460,994 | 7/1984 | Scanlon et al. | 370/88 |
| 4,489,379 | 12/1984 | Lanier et al. | 395/200 |
| 4,517,644 | 5/1985 | Hamada et al. | 395/200 |
| 4,562,539 | 12/1985 | Vince | 395/200 |
| 4,627,055 | 12/1986 | Mori et al. | 371/16 |
| 4,663,706 | 5/1987 | Allen et al. | 395/800 |
| 4,667,287 | 5/1987 | Allen et al. | 395/800 |
| 4,752,924 | 6/1988 | Darnell et al. | 370/86 |
| 4,779,087 | 10/1988 | Fukuda et al. | 340/825.05 |
| 4,785,397 | 11/1988 | Koizumi et al. | 395/650 |
| 4,816,993 | 3/1989 | Takahashi et al. | 395/250 |
| 4,831,512 | 5/1989 | Nakai et al. | 395/200 |
| 4,843,539 | 6/1989 | Bury | 395/250 |
| 4,884,192 | 11/1989 | Terada et al. | 395/200 |
| 4,888,683 | 12/1989 | Koizumi et al. | 395/650 |
| 4,935,866 | 6/1990 | Sauvajol et al. | 395/325 |
| 5,129,093 | 7/1992 | Muramatsu et al. | 395/800 |
| 5,202,971 | 4/1993 | Henson et al. | 395/425 |
| 5,230,073 | 7/1993 | Gausmann et al. | 395/600 |
| 5,241,540 | 8/1993 | Ocheltree | 370/85.12 |
| 5,250,943 | 10/1993 | Childs et al. | 340/825.8 |
| 5,432,909 | 7/1995 | Cok | 395/200.03 |

OTHER PUBLICATIONS

Bertsekas, *Data Networks*, Prentice–Hall, Inc., 1987, pp. 205–267.

Hayes, *Computer Architecture and Organization*, McGraw–Hill, Inc., 1988, pp. 468–506.

Transputer Databook, Second Edition 1989.

*Primary Examiner*—Tod R. Swann
*Assistant Examiner*—Denise Tran
*Attorney, Agent, or Firm*—Thomas H. Close

[57] ABSTRACT

A method and an apparatus for interprocessor communication in which each processor simultaneously outputs a local data subset of a data set and simultaneously receives foreign data subsets of the data set in both directions around a ring of processors. A destination data memory buffer the size of the entire data set is accessed for transmission and reception and uses four data pointers, two input and two output, whose positions in the memory buffer correspond to the data subsets passing into and out of the processor in each direction at that moment and which correspond to a direction of output or input. The processors pass the subsets one-half of the way around the ring in each direction. Each processor knows whether a data subset should be passed on to neighboring processors. Received each foreign data subset received is stored in the data memory buffer in the correct position as designated by the appropriate input data pointer. The stored data subset, if necessary, is then read out and communicated to the appropriate neighboring processor.

3 Claims, 8 Drawing Sheets

METHOD AND APPARATUS FOR BROADCASTING DATA IN A RING CONNECTED MULTIPROCESSOR

This is a Continuation of U.S. application Ser. No. 07/866,723, filed Apr. 10, 1992, now abandoned.

BACKGROUND OF THE INVENTION

1. Field of the Invention

The present invention is directed to a method and apparatus for broadcasting a distributed data set distributed over various processors on a multiprocessor ring so that every processor will contain the complete data set and, more particularly, using a bidirectional communication within the ring of processors which communicates each subset of the distributed data set the minimum distance possible and does not require additional buffer space within each processor.

2. Description of the Related Art

Parallel computers are becoming increasingly popular as a means of achieving high-performance computing especially in image processing applications. A parallel computer is a computer which is composed of more than one independent processor unit. These computers are often divided into different classes which reflect the organization of the processors and memory in the computer. Those computers whose processors share a common memory to which every processor has direct access are called shared-memory parallel computers. Those computers whose processors each have a separate memory which cannot be accessed by any other processor are called distributed-memory parallel computers. While the processors in a distributed-memory computer cannot access the separate memory of another processor, the processors can communicate information with each other by using interprocessor communication links.

These two types of computers each have advantages and disadvantages with respect to different kinds of computing tasks. A shared-memory parallel computer is most effective on tasks which have a relatively low number of memory accesses but whose memory accesses are very unpredictable and can be to any portion of the common memory. The performance of a shared-memory machine is limited by the shared memory access bandwidth. In contrast, a distributed-memory parallel computer is most effective when the memory accesses are very heavy but relatively well organized and segmented. The performance of this type of computer is limited by the link communication bandwidth. The present invention relates to a communication method for distributed-memory parallel computers with at least two bidirectional communication links per node or processor.

Because the performance of distributed-memory parallel computers is limited by the communication bandwidth between the processors, it is important to minimize the inter-processor communication and thus maximize the computer's performance. To minimize the inter-processor communication, one must organize the distribution of data carefully so that each processor has all the data that it needs. Unfortunately, this cannot be done in any general sense. The access of or need for particular data in an algorithm is simply dependent on the algorithm itself. Different algorithms will access data in different ways.

To minimize this problem, programmers for distributed-memory parallel computers will generally choose some compromise for the data distribution which reduces the interprocessor communication for the most common operations on the data set. However, there will always be some operations for which an alternative data distribution is superior.

The most common data distribution scheme for distributed-memory parallel processors is one in which each processor has an equal amount of data and no data is stored in more than one processor. The data are grouped in such a way as to minimize any interprocessor communication. Nevertheless, it is also fairly common for a computing task to be more efficiently executed if the complete data set is stored in every processor.

For this kind of task there are two alternative communicating methods which are commonly used. The first is to have each processor request only the needed data from whichever processor has the needed data by sending messages through the communication links. The second is to simply broadcast the data from every processor to every other processor regardless of whether all the data is needed. Once the data has arrived, each processor can continue its task by accessing whatever data from the entire set the processor needs. At this point, each processor will contain a complete data set.

The first alternative will minimize the communication of information, but at the expense of a less organized program and with additional messaging overhead required to support the request/reply cycle. The second alternative may move more data but does it in a very organized and optimizable way. The preferred alternative will once again depend on the application program requirements.

If a broadcast of all the data from every processor is chosen, it is imperative that the implementation of this task be as efficient as possible.

SUMMARY OF THE INVENTION

It is an object of the present invention to implement an efficient broadcast of all data subsets in a data set to all processors in a ring connected multiprocessor system.

It is another object of the present invention to maximize the use of the interprocessor interconnection bandwidth during data distribution.

It is also an object of the present invention to provide multidimensional subset data broadcasts.

It is a further object of the present invention to implement efficient ring communication using conventional hardware components.

It is still another object of the present invention to minimize buffer memory requirements for the communication operation.

The above objects can be attained by a method and apparatus for interprocessor communication which, by using direct memory access type communication link interfaces, simultaneously outputs data in both directions around a ring of processors. The invention uses a destination data buffer memory accessible by the direct memory access communication link interfaces and data pointers whose positions in the buffer memory correspond to the data passing into and out of the processor in each direction at that moment. The processors in the ring together pass each data packet or subset of the entire data set or vector one half of the way around the processor ring in each direction. Each processor knows the number of processors in the ring and by counting the communication steps or operations each processor can calculate whether data should be passed on to neighboring processors. As each data subset enters the processor, regardless of direction, the data packet is stored in the data buffer memory in the correct position as designated by the appropriate data pointer. The data stored, if necessary, is then read out of the buffer memory and communicated to the appropriate neighboring processor.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
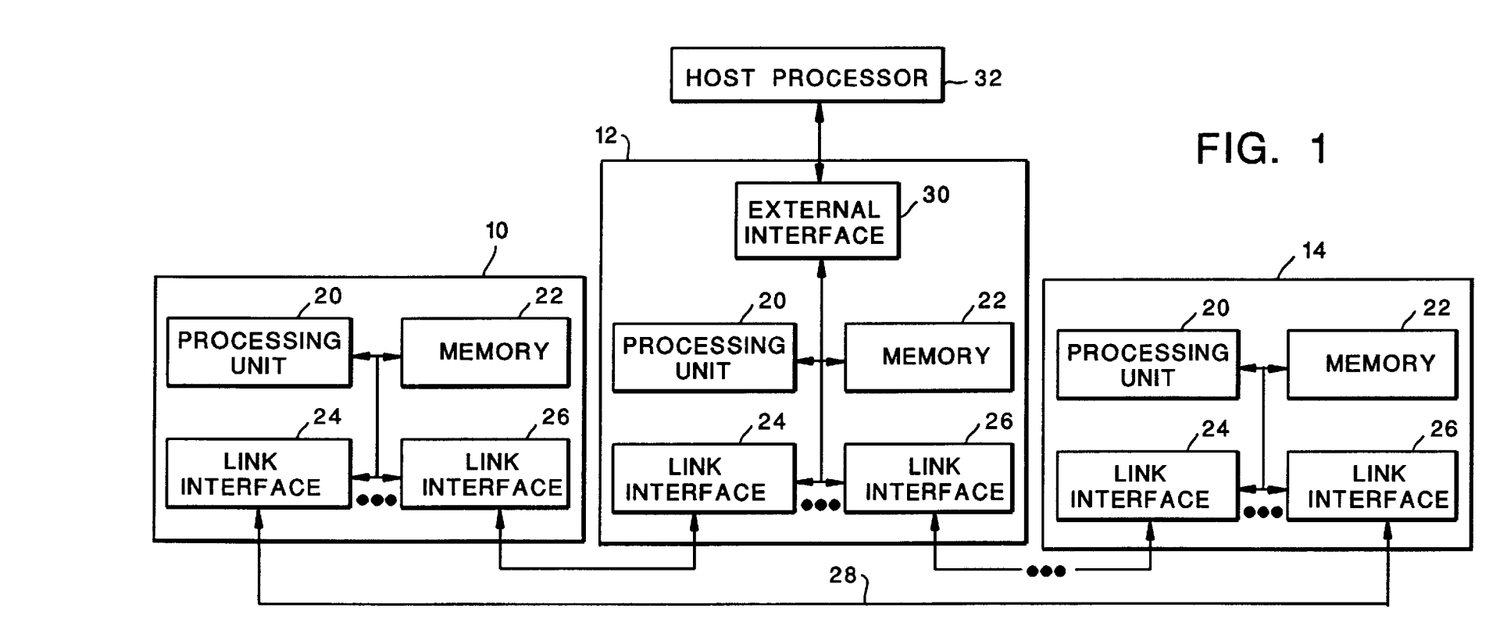
FIG. 1 illustrates the typical hardware in a ring connected multiprocessor in accordance with the present invention.

The present invention is directed to a method and an apparatus for the efficient redistribution of a distributed data set which includes plural data elements distributed in subsets among the processors in a multiprocessor ring-connected network in which the processors in the ring are interconnected with bi-directional links as illustrated in FIG. 1. The typical operation in which the present invention is needed is a mirroring or rotation operation on a very large image. Each processor 10, 12 and 14 in the ring is typically an INMOS transputer high performance processor, such as the IMS T800 transputer, running identical programs. All the processors in the ring can be on a single circuit board although this is not required. Each processor 10, 12 and 14 includes a processing unit 20 and a memory 22. The processing unit 20 accesses the memory 22 to perform processing operations, such as image processing operations. The memory 22 stores the data set as well as the destination data memory buffer used for communicating the data subsets between the processors 10, 12 and 14. Each processing unit 10, 12 and 14 also includes several link interfaces 24 and 26. The link interfaces are connected such that a processor ring 28 is formed in which the link interface units 24 and 26 of neighboring processors are connected. The ring is discontinuous in the sense that communication around the ring is performed by the processors receiving data and transmitting the data further around the ring. The link interfaces 24 and 26 are direct memory access type link interfaces that, once the processing unit 20 has instructed or flagged the link interface to perform a data communication and provided the link interface with the pointer to the data being transmitted along with the size of the data subset being transmitted, will, in a conventional manner, transmit the data without further operation by the processing unit 20 and indicate to the processing unit 20 when the data transmission is complete. That is, processing unit 20, once a data communication has been commanded or initiated by setting the appropriate flags, can perform other tasks while the communication is being performed. The link interfaces 24 and 26 operate in parallel, so that communication (transmitting and receiving) in both directions around the ring can be performed simultaneously by a single processor. At least one of the processors 10, 12 and 14 should include an external interface 30 which communicates with a host processor 32.

During the discussion of the method of the present invention, which performs the efficient redistribution of multiple distributed subsets of a data set on a multiprocessor ring interconnected with bidirectional links, such as illustrated in FIG. 1, the variable p will be used to denote the number of processors in any such ring. A data set of n elements can be distributed in data subsets over a ring processor with p processors by allocating n/p data elements in a subset to each of p-1 processors with the pth processor having the remainder. The data of any one distributed set that is stored within one processor is referred to here as a subset and a data subset can include plural data elements. The subsets that are stored in a particular processor are called local subsets and subsets stored in other processors are called foreign subsets. Each data element can be as small as a single bit or as many bytes as desired. it is not necessary, however, that every processor have the same amount of data, that is, the subsets within different processors can be of different sizes (that is, have different numbers of elements with different element sizes). The method described herein will work for any amount and distribution of data, even if some processors have no data at all. However, to achieve the greatest possible communication throughput and to maximize bandwidth utilization of the communication paths between processors, each processor must contain the same size subsets, so that the communications are balanced.

Figure 2:
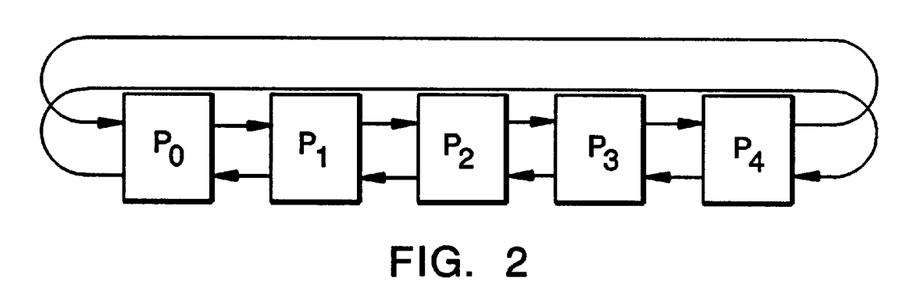
FIG. 2 illustrates a five-node multiprocessor ring with bi-directional links.
Figure 3:
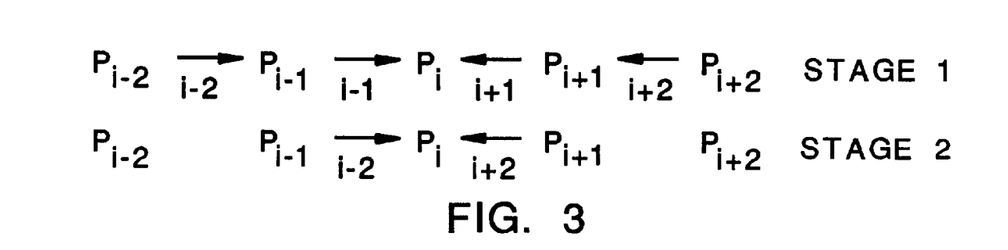
FIG. 3 illustrates the logical communication necessary to transfer all data subsets to a processor in FIG. 2.

An example of a 5-node ring multiprocessor is shown in FIG. 2 including processors $P_0$–$P_4$. The bidirectional links are shown more explicitly as two unidirectional links on each side of the processor and communication simultaneously in both directions over the bidirectional (two unidirectional) links is possible. The broadcasting communication operations from the point of view of each processor can be seen by assuming that the ring connection diametrically opposite the processor whose point of view (processor i) we are taking is broken. For example, in FIG. 2 the link between processors $P_0$ and $P_4$ is assumed broken and processor $P_i$ is processor $P_2$. On each side of that processor ($P_2$) data is passed in as shown in FIG. 3. In FIG. 3 the links connecting the processors labelled P are shown as arrows and the data subset initially stored within each processor and communicated on the links are indicated by the label associated with the arrow. Here we see that at the first stage every processor on the left side of processor $P_i$ is passing data to the right and on the right side of processor $P_i$ the data is being passed to the left. At the first stage the data from the immediate neighbors $P_{i-1}$ and $P_{i+1}$ ($P_1$ and $P_3$ in the example mentioned above) is received, at the second stage data from the next nearest neighbor $P_{i-2}$ and $P_{i+2}$ ($P_0$ and $P_4$ in the example mentioned above), and so on. This process continues until all the data is passed to processor $P_i$. The number of stages necessary is one half the number of processors, that is, p/2 since data is passed in from each side simultaneously. The task of the distribution method of the present invention is to interleave the communications between processors such that this distribution is accomplished simultaneously for every processor in the ring while fully utilizing the link communication bandwidth and passing data the minimum distance necessary.

Figure 4A:
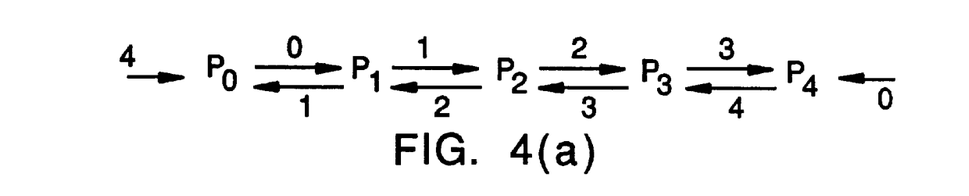
FIGS. 4(a) and 4(b) illustrate communication interleaving for a distributed dataset broadcast for the five-node ring of FIG. 2.
Figure 4B:
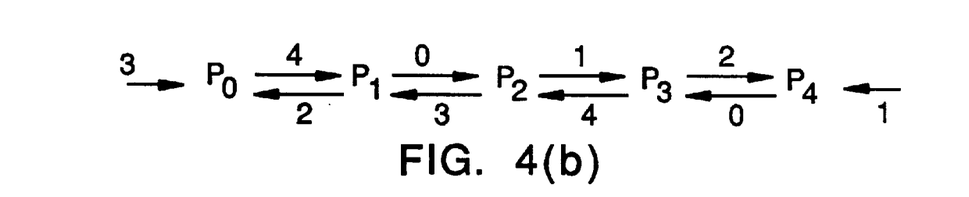

This objective is accomplished by requiring every processor in the ring to simultaneously communicate its data subsets to its neighbors. This task will use every link connected to every processor and is illustrated in FIGS. 4(a) and 4(b). In FIGS. 4(a) and 4(b), the links connecting the processors $P_0$–$P_4$ are shown as arrows and the data subset being communicated on the links indicated by the label of the arrow. Note that if the data subsets are identical in size (have the same number and size data elements), every communication will take the same amount of time and the link bandwidth will be saturated. The data communication is repeated p/2 times. In the first communication (step 1) as shown in FIG. 4(a), each processor passes its own data. In the example processor $P_2$ sends its own or local data subset, subset 2, to processors $P_1$ and $P_3$. In this step processor $P_2$ receives and stores the foreign data subsets from processors $P_1$ and $P_3$. Thereafter each processor stores and then passes the foreign data subset the processor has received from one side to the opposite side. For the 5-processor illustration used here, the process is repeated 5/2 times, or twice. In the second communication, step 2, as shown in FIG. 4(b), processor $P_2$ passes the foreign data subset from processor $P_3$, subset 3, to processor $P_1$ and passes the foreign data subset of processor $P_1$, subset 1, to processor $P_3$. In this step processor $P_2$ simultaneously receives and stores the data of processors $P_0$ and $P_4$. A careful examination of the FIGS. 4(a) and 4(b) indicates that every processor has received every piece of data in the system at the end of step 2.

Figure 5:
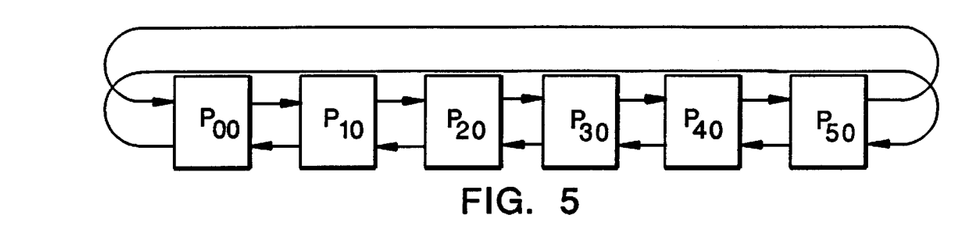
FIG. 5 illustrates a six-node multiprocessor ring with bi-directional links.
Figure 6A:
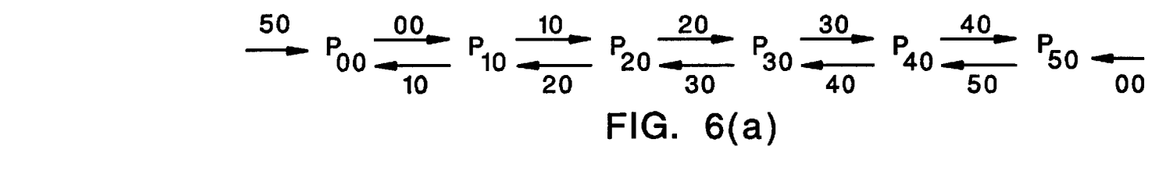
FIGS. 6(a)–6(c) illustrate communication interleaving for a distributed dataset broadcast for the six nodes of FIG. 5.
Figure 6B:
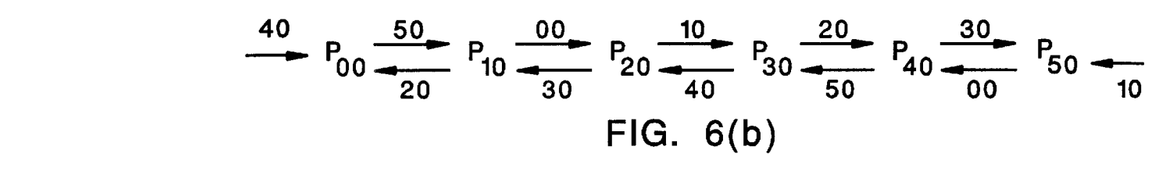
Figure 6C:
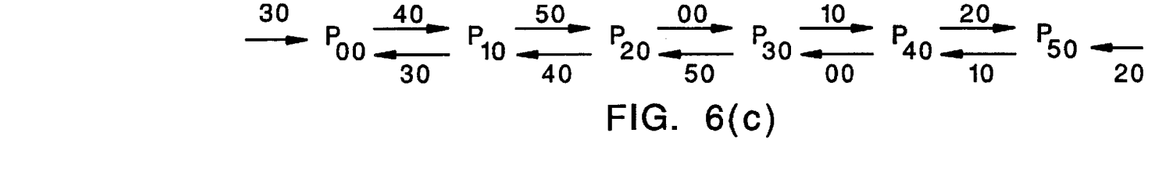

The method discussed above works for every odd-sized ring network. An even-sized network will work identically except for the last stage. An even sized network with six processors $P_{00}$–$P_{50}$ is shown in FIG. 5 and the stages of communication are shown in FIGS. 6(a)–6(c). A careful examination of FIGS. 6(a)–6(c) indicates that every node receives every data subset. The last data subset however, is received twice, once from each side simultaneously. This requires that one of the data subsets received by each processor in the last step be ignored or discarded as will be discussed in more detail later.

To support the various data transfers and to store the final data set, that is, store all data subsets, each processor 10, 12 and 14 maintains an area (a data array or destination data buffer memory, for example) in memory equal in size to the size of the entire data set. For example, if the data set contains twenty five equal-size data elements the array would be 1 by 25. Four memory pointers are maintained by each processor and which point to various portions of this memory. The first pointer $R_{in}$ maintains the position of the data being input from the right, the second pointer $L_{in}$ maintains the position of the data being input from the left, the third pointer $L_{out}$ maintains the position of the data being output to the left, and the fourth pointer $R_{out}$ maintains the position of the data being output to the right. The array or buffer is considered to be a ring such that a pointer at the 25th data element when incremented points to the 1st element and a pointer at the 1st element when decremented points to the 25th element. These pointers then move over the memory as the various portions of data are communicated. The right-side input and left-side output pointers move in a manner in which memory addresses are increasing, the right-side output and left-side input pointers move in a manner in which memory addresses are decreasing.

Figure 7:
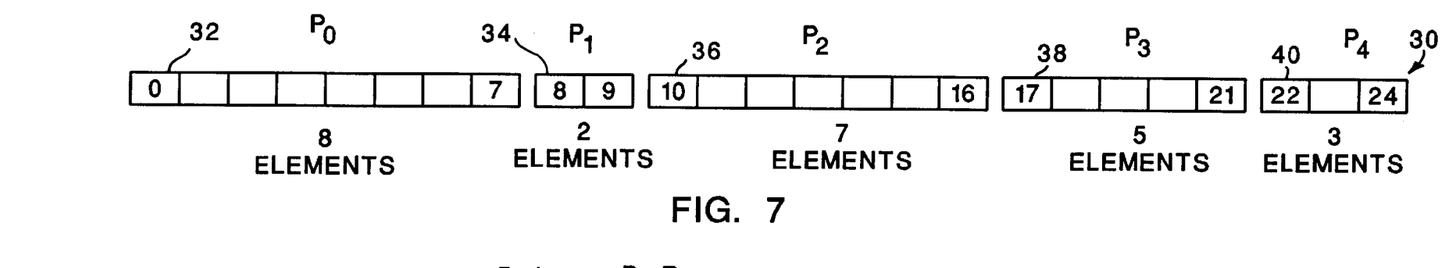
FIG. 7 illustrates an example distribution of twenty-five data elements in five subsets distributed over a five-processor ring as illustrated in FIG. 2.
Figure 8A:
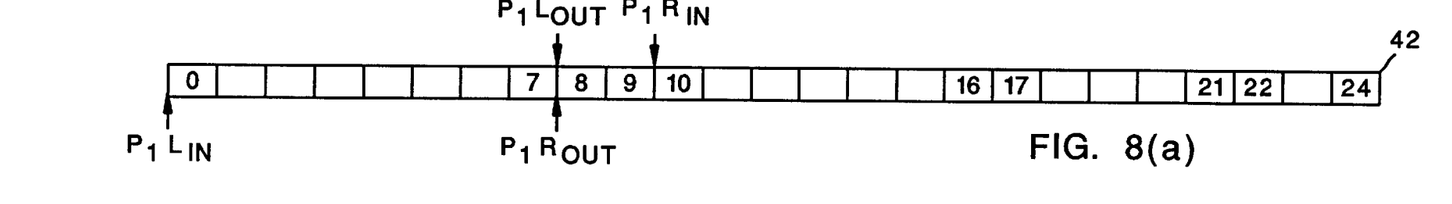
FIGS. 8(a) and 8(b) illustrate the pointer positions for processor $P_1$ of FIG. 2 prior to first and second communications.
Figure 8B:
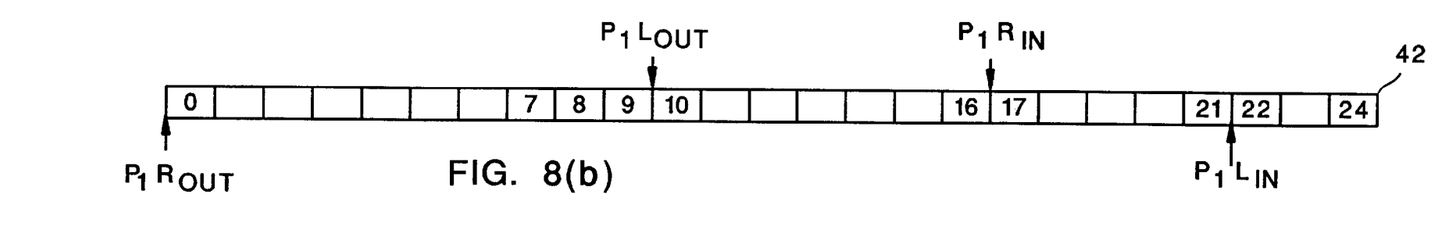
Figure 8C:
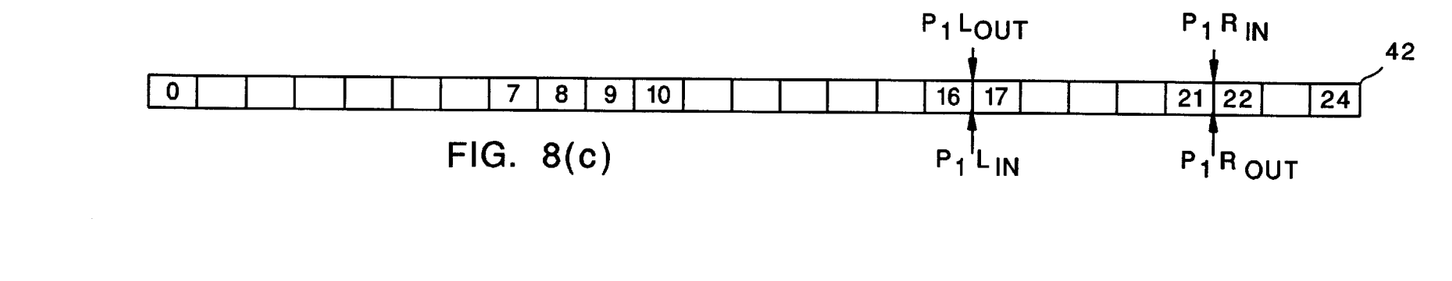
FIG. 8(c) illustrates the final position for the pointers for processor $P_1$ of FIG. 2.

Initially, both output pointers $R_{out}$ and $L_{out}$ within each processor 10, 12 and 14 point to the beginning of the data subset stored within that processor. For example, the output pointers for processor $P_2$ will point to the beginning of subset 2. The left input pointer $R_{in}$ will point to the storage location for the subset before the local data subset and in the example of processor $P_2$ this would be subset 1. The right input pointer $R_{in}$ will point to the data subset immediately following the local subset, that is, the pointer would point to subset 3, a foreign subset stored in processor $P_2$. The pointers within each processor will thus point to a different memory area within the destination data buffer depending on the position of the processor within the ring. FIG. 7 illustrates one possible distribution of a twenty-five element data set 30 with five subsets 32, 34, 36, 38 and 40 distributed over the five-processor ring shown in FIG. 2. The data in this example are not evenly distributed over the processor ring because the pointer movements are more easily understood when the subsets have different sizes. The objective is to communicate the various data subsets to every processor so that, in this example, every processor will contain all twenty-five data elements. FIGS. 8(a) and 8(b) illustrate the positions of each pointer for processor $P_1$ of the 5-node example of FIG. 7 prior to the first and second communications (steps). FIG. 8(c) shows the final position of the pointers after all communications and updates are complete.

After the first communication (step 1) the pointers are moved an amount equal to the size of the data subset input or output. The left output pointer $P_1L_{out}$ is set to the position of the right input pointer $P_1R_{in}$, the right output pointer $P_1R_{out}$ is set to the position of the left input pointer $P_1L_{in}$, the left input pointer $P_1L_{in}$ is moved by the amount to be input on the left (8 elements), and the right input pointer $P_1R_{in}$ is moved by the amount (7 elements) just input from the right. All pointer movements are done modulo the data set size, so that if a pointer moves past the zero it is reset to the right side of the array 42 and if a pointer moves past the right side of the array 42 it is reset to zero. Note that every processor must know either the size of every data subset which it is to receive or the size must be sent as an initial value which is then used to input the data itself.

Figure 9:
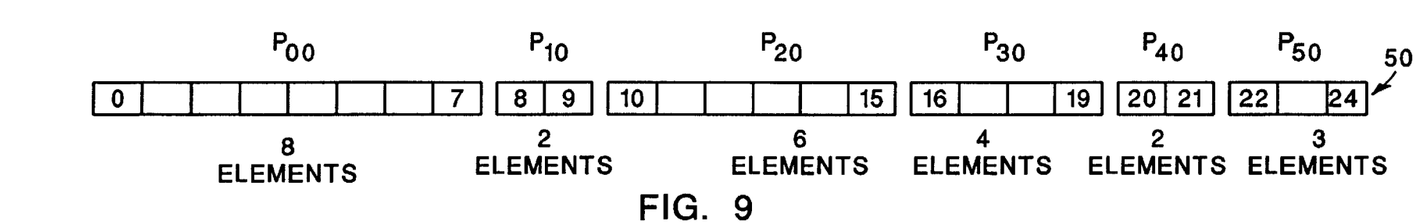
FIG. 9 illustrates an example distribution of a dataset with twenty-five data elements divided into six subsets distributed over a six-processor ring such as illustrated in FIG. 5.
Figure 10A:
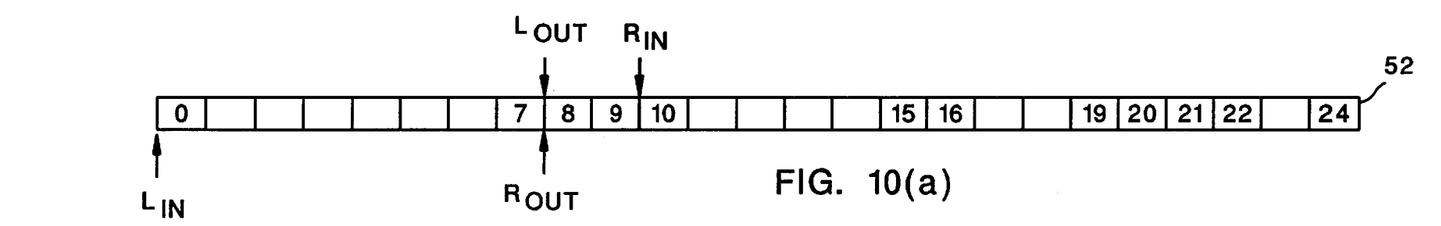
FIGS. 10(a)–10(c) illustrate pointer positions for processor $P_{10}$ of FIG. 5 prior to each communication.
Figure 10B:
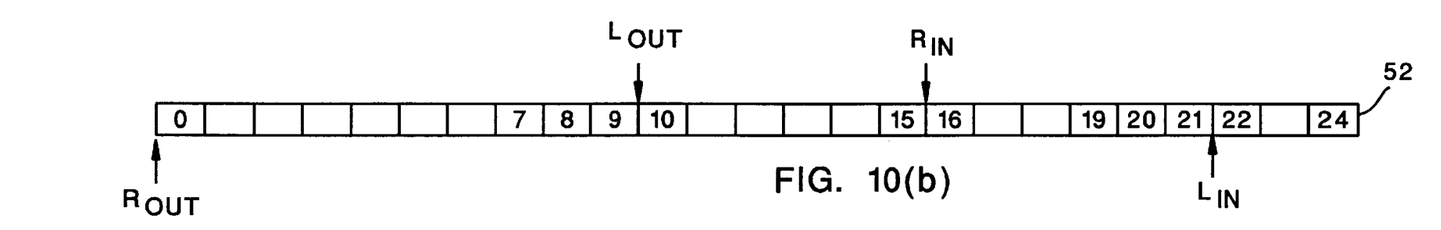
Figure 10C:
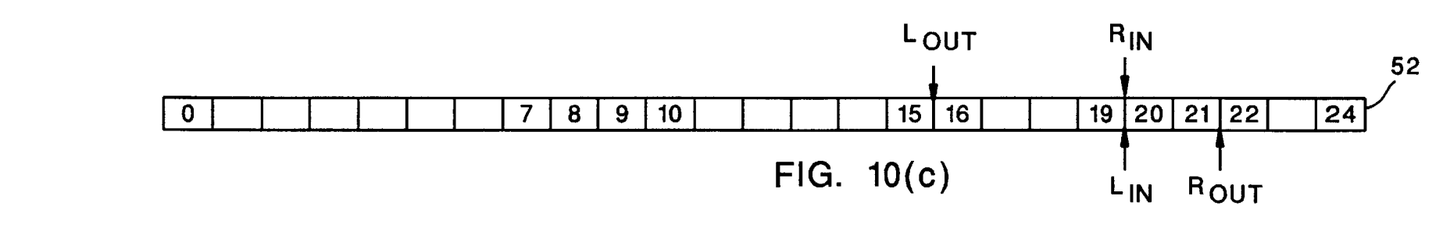

FIGS. 9 and 10(a)–10(c) illustrate an example of pointer movement for a 6-node processor ring such as illustrated in FIG. 5. FIG. 9 illustrates an arbitrary data distribution while FIGS. 10(a)–10(c), showing pointer positions prior to each communication, illustrate the movement of the pointers for that data set. Note that this second case works identically to the first except that the last inputs from each side must stored in the same place or one of the subsets received must be ignored or discarded.

Figure 11:
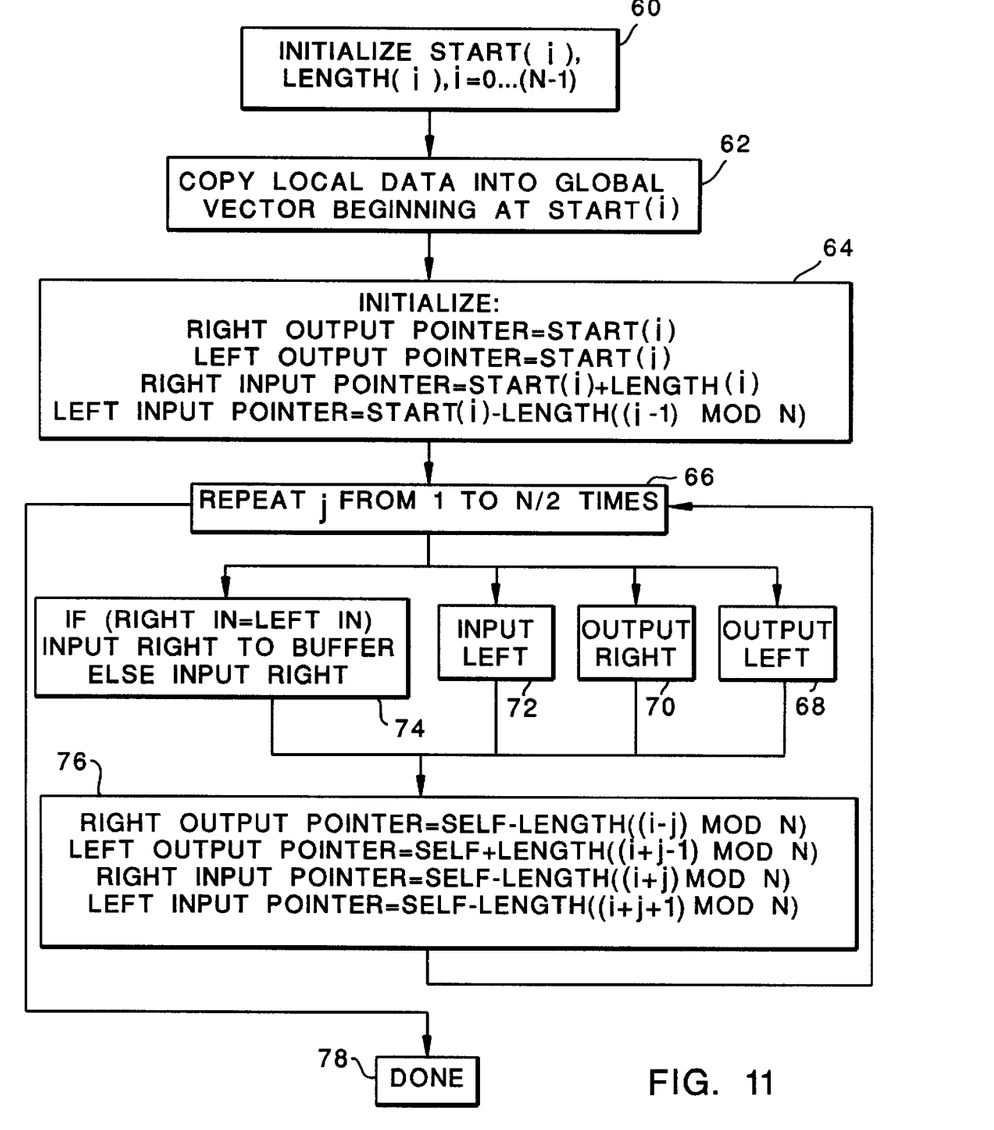
FIG. 11 is a flowchart for the process executed by a processor in a processor ring containing N processors.

The process performed by the processing unit 20 of each processor 10, 12 and 14, as illustrated in FIG. 11, starts by initializing 60 start and length arrays which use a processor counter i which varies from 0 to the number (N−1) of the last processor. For example, position 2 in the start array includes a value pointing at element 8 of the data subset for processor $P_{10}$ in FIG. 9, as shown in FIG. 10(a), while position 2 in the length array holds the value 2. Once the arrays are initialized, the local data set is copied into the global vector or destination data buffer (the data memory buffer or array) used for transmitting and receiving the distributed data. That is, in the example of FIGS. 9–10(c) data elements 8 and 9 for processor $P_{10}$ are copied into the destination data buffer or array 52 at positions 8 and 9. The use of this buffer 52, which is the size of the data set, results in minimizing the size of the buffer needed or, in other words, the amount of memory required for the buffer is the smallest possible. Next the processor initializes 64 the input and output pointers. For example, the left and right output pointers for the example of FIG. 10(a) would be initialized to point to the data subsets. Once the input and output pointers have been initialized, the process enters a loop which is repeated 66 for the number of processors N in the ring divided by 2. During the loop, the left output, right output, left input, and right input operations are initialized or started 68, 70, 72 and 74 effectively simultaneously by setting appropriate hardware flags for the link interfaces 24 and 26. Because these operations are synchronized with the corresponding operations of the neighboring processors no wait step is necessary after the operations are initiated. The next operation of step 76 cannot, however, be performed until the input and output operations are complete. The right input operation to the data memory buffer array is, however, conditioned upon the right and left input pointers not being equal. Whenever the right and left input pointers are equal, the processing unit 20 provides the link interface with a pointer to a temporary buffer rather than the right input pointer for the data memory buffer array. The temporary buffer is not used which results in the duplicate data being ignored and written over and discarded the next time the temporary buffer is loaded. This solves the identical input problem previously mentioned for rings with an even number of processors. Whenever the right and left input pointers do not equal the right input pointer to the buffer array is provided to the link interface. Once the input and output operations have been initiated, the pointers can be updated 76. That is, the pointers can be updated 76 while the communication operation is being performed. As an alternative, to ensure that the pointers are not updated whenever the communication operation fails, the update operation 76 can be performed after all of the link interfaces 24 and 26 have indicated that the communication operation is completed. When the communication operation is completed or done 78 the processing unit 20 can proceed with the desired image data processing operation.

Figure 12:
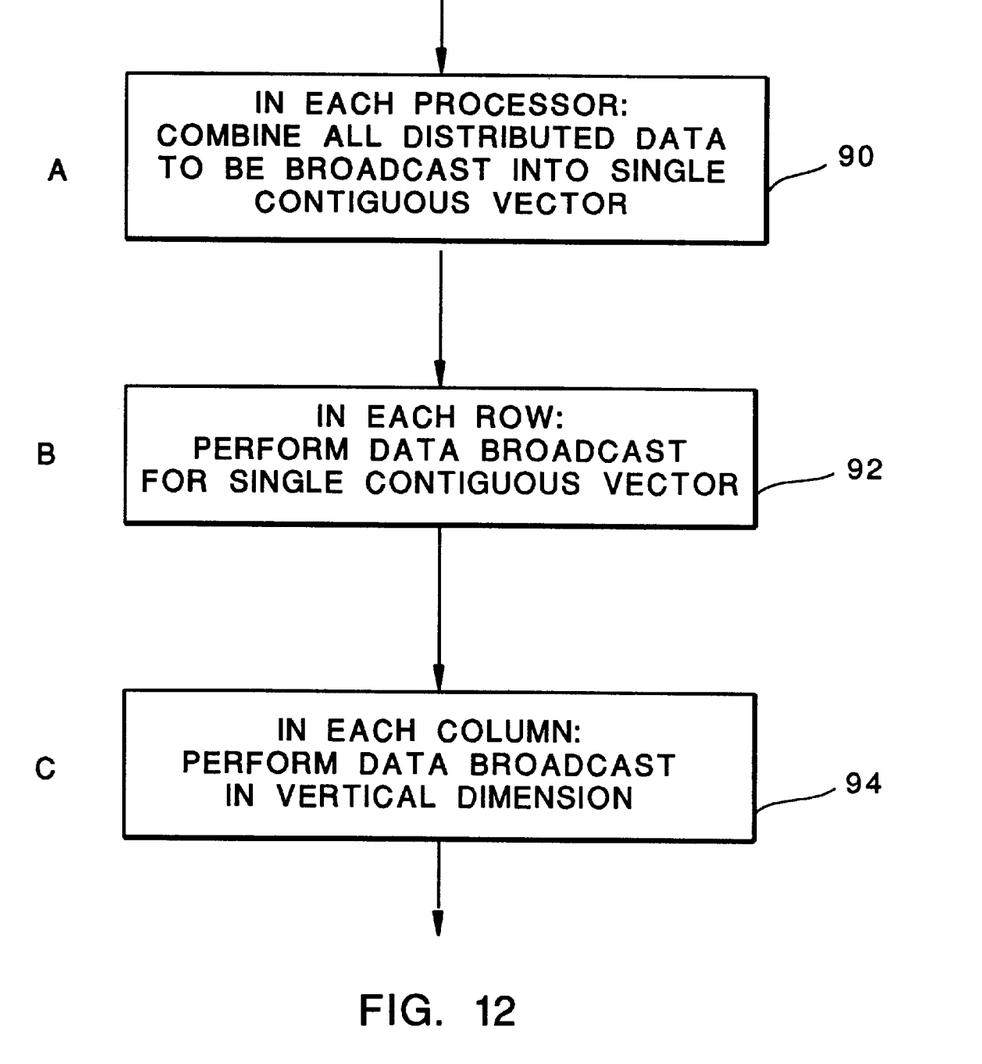
FIG. 12 is a flowchart of a distributed data broadcast for a two dimensional array.
Figure 13A:
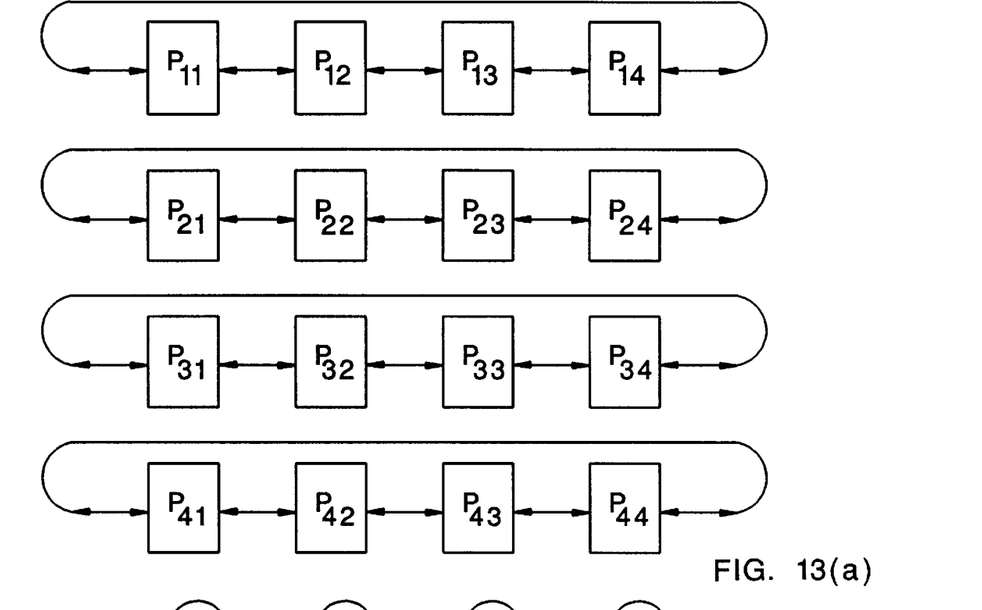
FIGS. 13(a) and 13(b) illustrate the communications performed in accordance with FIG. 12.
Figure 13B:
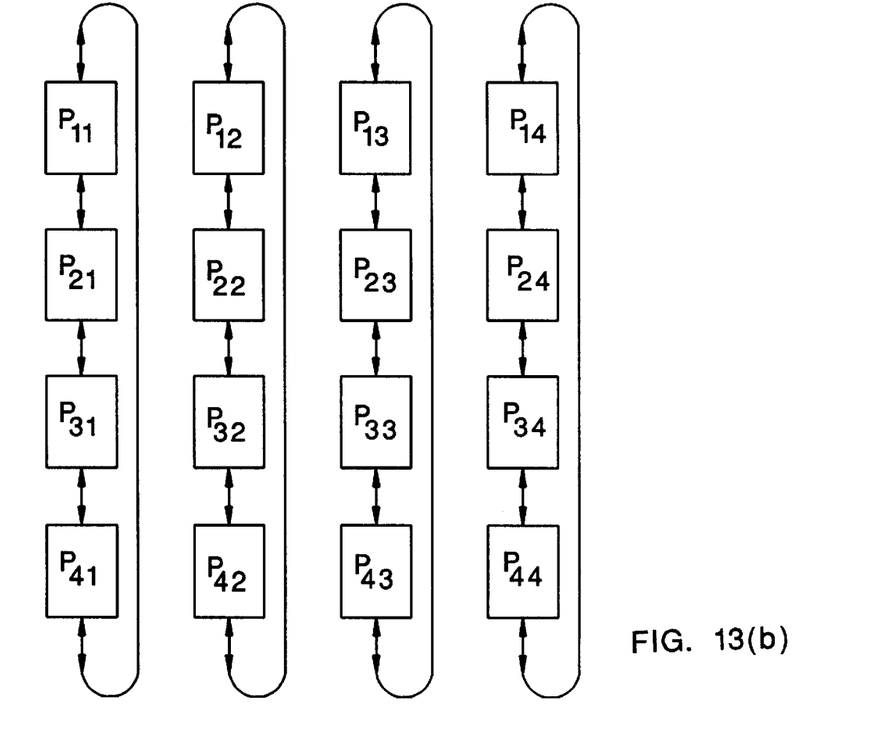

To this point the present invention has been described with respect to distributing data within a single dimensional array or ring, however, the present invention is equally applicable to a multidimensional array in which processors are ring linked. For example, the present invention will improve the distribution of data sets in a two dimensional array in which the processors in a row are linked in a ring and each processor in the row is also ring linked to the processors in its corresponding column of the array. Because the preferred processor includes four link interfaces this type of two dimensional linking is possible using the same processor previously mentioned. FIG. 12 illustrates the operations which would be performed by each processor in such a two dimensional ring linked array. The first step is for each processor in the two dimensional array to load 90 the local data for that processor into a single contiguous vector capable of storing the entire two dimensional data set. However, the vector could be a two dimensional vector. Each processor then performs 92 the broadcast operation of FIG. 11 for each row within the contiguous vector. For example, row zero of the processors will distribute their data in row zero of the data array, row one of the processors will distribute their data in row one of the data array, etc. At this point each processor will contain a complete row of it's two dimensional set within the larger two dimensional set. Once all of the row transmissions have been performed, corresponding column transmissions are performed 94 as described with respect to FIG. 11. The operation performed in accordance with FIG. 12 is illustrated in FIGS. 13A and 13B. Operations in even higher dimensions are also possible using the same techniques.

The present invention maximizes link bandwidth utilization because both communication directions of each link are used simultaneously. The invention moves the data the minimum distance and minimizes buffer needs. The invention also has a low overhead since a minimum number of operations are necessary.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, since a ring-connected multiprocessor is a subset of a toroidally-connected multiprocessor, the method of the present invention also applies to any ring subset of any other link-connected multiprocessor.

What is claimed is:

1. A method of redistributing a data set having data subsets distributed in a ring of processors, each processor having a buffer memory, the ring of processors being interconnected with bidirectional links such that each processor in the ring is connected for data transmission to neighboring processors in both directions around the ring, the number of processors between one processor and another processor around the ring in a given direction being the distance between the processors in the given direction, the bidirectional links having an interconnection bandwidth, said method comprising the steps of:

(a) transmitting local data subsets simultaneously in both directions of the ring simultaneously from all processors in the ring; and (b) transmitting foreign data subsets in a direction of travel of the foreign data subsets around the ring until all processors in the ring have received the data set, whereby a redistribution of the distributed data subsets that saturates the interconnection bandwidth, minimizes the number of data transmissions, passes data the minimum distance necessary, and minimizes buffer memory requirements is achieved.

2. A method of redistributing a data set in a ring of processors where each processor stores a local data subset of the data set, has left and right inputs and left and right outputs connected to adjacent processors in the ring for receiving and transmitting data respectively, each processor having a buffer memory, the ring of processors having an interconnection bandwidth, the number of processors between one processor and another processor around the ring in a given direction being the distance between the processors in the given direction, the adjacent processors storing foreign data subsets of the data set, said method comprising the steps of:

(a) transmitting the local data subset simultaneously through the right and left outputs simultaneously from all processors in the ring;

(b) updating left and right output pointers to the data set by a size of the local data subset;

(c) receiving the foreign data subsets through the right and left inputs and storing the foreign data subsets in the data set using right and left input pointers to the data set;

(d) updating the left and right input pointers to the data set by corresponding sizes of the foreign data sets received through the left and right inputs;

(e) transmitting the foreign data subset received through the left input through the right output and transmitting the foreign data subset received through the right input through the left output;

(f) updating the left and right output pointers to the data set by the corresponding sizes of the foreign data sets transmitted through the left and right outputs; and (g) repeating steps (c) through (f) until all processors in the ring have received the data set, whereby a redistribution of the distributed data subsets that saturates the interconnection bandwidth, minimizes the number of data transmissions, passes data the minimum distance necessary, and minimizes buffer memory requirements is achieved.

3. A method for redistribution of a complete data set having data subsets located within every processor of a bi-directional ring-connected multiprocessor, each processor having a buffer memory, the multiprocessor having an interconnection bandwidth, the number of processors between one processor and another processor around the ring in a given direction being the distance between the processors in the given direction, comprising the steps of:

(a) every processor in the ring simultaneously transmitting a local data subset simultaneously to both immediate neighbors in the ring;

(b) every processor in the ring storing the received data subsets locally;

(c) every processor in the ring transmitting received data subsets to the next processor in the ring in a direction of travel of the received data subset; and (d) repeating steps (b) and (c) until every processor in the ring has received the complete data set, whereby a redistribution of the distributed data subsets that saturates the interconnection bandwidth, minimizes the number of data transmissions, passes data the minimum distance necessary, and minimizes buffer memory requirements is achieved.

* * * * *